June 11, 1946.    N. S. SHELTON    2,401,886
FISHHOOK HOLDER
Filed Dec. 23, 1944
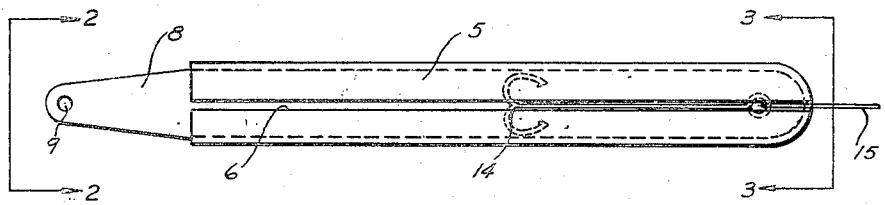
FIG. 1
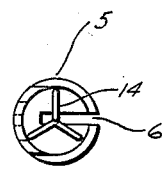    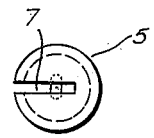
FIG. 2    FIG. 3
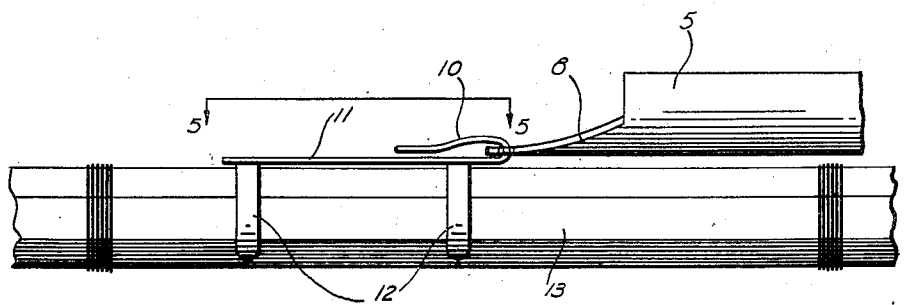
FIG. 4
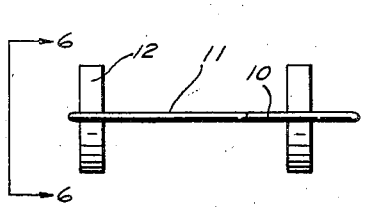    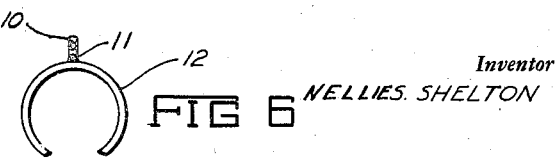
FIG. 5    FIG. 6
Inventor
NELLIE S. SHELTON
By Clarence A. O'Brien
and Harvey B. Jacobson
Attorneys Patented June 11, 1946

2,401,886

UNITED STATES PATENT OFFICE 2,401,886

FISHHOOK HOLDER

Nellie S. Shelton, Missoula, Mont.

Application December 23, 1944, Serial No. 569,539

4 Claims. (Cl. 43—31)

The present invention relates to new and useful improvements in holders for fish hooks and artificial bait adapted for attaching to a fishing pole and in which the hook or artificial bait may be placed to keep the same from becoming entangled with brush through which the fisherman may be walking, or with the clothing of the fisherman, and from which the hook or artificial bait may be instantly removed when desired for use.

A still further object of the invention is to provide a holder of this character in which the fish hook or artificial bait may be placed for display purposes or carried in the pocket of a person with safety.

A still further object is to provide a device of this character of simple and practical construction, which is neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which Figure 1 is a top plan view of the holder.

Figure 2 is a front end elevational view.

Figure 3 is a rear elevational view.

Figure 4 is a fragmentary side elevational view showing the attaching hook for the holder attached to a fishing rod.

Figure 5 is a top plan view of the attaching hook, and

Figure 6 is an end elevational view thereof.

Referring now to the drawing in detail, wherein for the purpose of illustration I have disclosed a preferred embodiment of the invention, the numeral 5 designates a substantially cylindrical holder, preferably constructed of transparent plastic or other suitable material, the holder being closed at one end with its other end open and one side of the holder is formed with a longitudinally extending slot 6 extending from the open end of the holder and communicating with a radially extending slot 7 formed in the closed end thereof.

The open end of the holder is provided with a longitudinally extending tongue 8 which tapers toward its outer end, the tongue at its inner end being curved to conform to the curvature of the holder 5.

The outer end of the tongue is formed with an opening 9 adapted for engaging a hook 10 which may be constructed of wire or other suitable material and includes a shank portion 11 to which a pair of spring clips 12 are attached, the clips being adapted for engagement with a fishing rod 13 whereby to secure the hook in longitudinally extending position on the rod.

The open end of the holder is adapted to receive a fish hook 14 of a multiple prong type such as shown in Figures 1 and 2 of the drawing and commercially known as a snag hook and the holder may also receive single fish hooks or artificial minnows or lures. The fish line 15 attached to the hook is inserted through the slot 6 to draw the hook toward the closed end of the holder, the line then being seated in the end slot 7 and by attaching the tongue 8 of the holder to the hook 10 carried by the fish pole and holding the line 15 taut, the fish hook will be retained in the holder against accidental loss or entanglement with a person's clothing or brush through which the person may be walking.

When the holder 5 is removed from the fish pole the same may then be used to carry the fish hook or artificial bait in the pocket of a person, or the holder may be used for containing the hook or artificial bait for display purposes.

It is believed that the details of construction and manner of use of the device will be readily understood from the foregoing without further detailed explanation.

Having thus described the invention, what I claim is:

1. A fish hook holder comprising a longitudinally split tubular member closed at one end and open at its other end for receiving a fish hook in the holder and with the fish line attached to the hook received in the split portion of the holder and means for attaching the holder to a fish pole.

2. A fish hook holder comprising a longitudinally split tubular member closed at one end and open at its other end for receiving a fish hook in the holder and with the fish line attached to the hook received in the split portion of the holder, an attaching member carried at the open end of the holder and means carried by a fish pole and engageable with said attaching member for securing the holder in longitudinally extending position on the pole.

3. A fish hook holder comprising a longitudinally split tubular member closed at one end and open at its other end for receiving a fish hook in the holder and with the fish line attached to the hook received in the split portion of the holder, a tongue extending longitudinally from the open end of the holder, a hook engaged with said tongue and clips carried by the hook and adapted for attaching the hook to a fish pole with the holder extending longitudinally thereof.

4. A fish hook holder comprising a cylindrical member closed at one end and open at its other end, said member having a slot extending longitudinally thereof and also having a slot extending radially of the closed end of the holder and communicating with said longitudinal slot, said holder being adapted to receive a fish hook with a line attached thereto into the open end of the holder and with the line adapted to pass through said longitudinal slot and into said radial slot at the end of the holder and means for attaching the holder in longitudinally extending position at one side of a fish pole.

NELLIE S. SHELTON.